(12) United States Patent
Oka et al.

(10) Patent No.: US 8,902,461 B2
(45) Date of Patent: Dec. 2, 2014

(54) COMMUNICATION CONTROL APPARATUS AND COMMUNICATION CONTROL SYSTEM FOR TRANSMITTING A SCANNED IMAGE VIA A NGN

(71) Applicants: Kabushiki Kaisha Toshiba, Tokyo (JP); Toshiba Tec Kabushiki Kaisha, Tokyo (JP)

(72) Inventors: Tomohide Oka, Shizuoka-ken (JP); Jun Sasano, Tokyo-to (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/749,859

(22) Filed: Jan. 25, 2013

(65) Prior Publication Data

US 2013/0201523 A1 Aug. 8, 2013

Related U.S. Application Data

(60) Provisional application No. 61/593,942, filed on Feb. 2, 2012.

(51) Int. Cl.
*G06F 3/12* (2006.01)
*H04N 1/00* (2006.01)

(52) U.S. Cl.
CPC ...... *G06F 3/1292* (2013.01); *H04N 2201/0046* (2013.01); *H04N 2201/0094* (2013.01); *H04N 1/00222* (2013.01)
USPC .......................... 358/1.15; 358/1.13; 709/217

(58) Field of Classification Search
CPC .. G06F 3/1293; H04N 1/107; H04N 1/00307; H04N 1/00413; H04N 1/00962; H04N 1/00973; H04N 2201/0094

USPC ................................. 358/1.13, 1.15; 709/217
See application file for complete search history.

(56) References Cited

U.S. PATENT DOCUMENTS

| | | | | |
|---|---|---|---|---|
| 8,610,935 | B1 * | 12/2013 | McKinley et al. | 358/1.15 |
| 2010/0238503 | A1 * | 9/2010 | Sakuda et al. | 358/1.15 |
| 2010/0309503 | A1 * | 12/2010 | Partridge et al. | 358/1.14 |

FOREIGN PATENT DOCUMENTS

JP 2008-182493 8/2008

\* cited by examiner

*Primary Examiner* — Jacky X Zheng
(74) *Attorney, Agent, or Firm* — Amin, Turocy & Watson, LLP (57) ABSTRACT

A communication control apparatus connected to an NGN includes an interface that is connected to an MFP and a portable terminal via a network, a control unit that generates a scanning designation screen for inputting a scanning condition in response to an original document scanning request from the portable terminal, provides a request for starting scanning in the scanning condition, acquires image data read by scanning an original document, converts the acquired image data into a thumbnail image so as to generate a preview screen, and generates a transmission destination information screen for designating a transmission destination from transmission destination address information, a transmission and reception unit that transmits the scanning designation screen, and an information selection screen including the preview screen and the transmission destination information screen to the portable terminal, and a call control unit that transmits the image data to the designated transmission destination via the NGN.

10 Claims, 6 Drawing Sheets

COMMUNICATION CONTROL APPARATUS AND COMMUNICATION CONTROL SYSTEM FOR TRANSMITTING A SCANNED IMAGE VIA A NGN

CROSS-REFERENCE TO RELATED APPLICATIONS

This application is based upon and claims the benefit of priority from U.S. Provisional Application No. 61/593,942 filed on Feb. 2, 2012; the entire contents of which are incorporated herein by reference.

FIELD

Embodiments described herein relate generally to a communication control apparatus and a communication control system.

BACKGROUND

In recent years, a broadband access network using ADSL (Asymmetric Digital Subscriber Line), FTTH (Fiber To The Home) or the like is rapidly spread, and thereby a technique for performing communication using an IP (Internet Protocol) network called a VoIP (Voice over IP) is developed.

As such a network, a network, for example, called an NGN (Next Generation Network) which can perform video communication, high-speed data communication, and the like, in addition to audio communication, is also proposed.

Meanwhile, the IETF (Internet Engineer Task Force) is an Internet standardization community that regulates an SIP (Session Initiation Protocol). The SIP is a protocol standardization of which is in progress as a technique for realizing real-time communication (for example, an IP telephony, a video conferencing, and the like) over the IP network.

An apparatus (communication control apparatus) for transmitting and receiving data using the SIP by connecting information terminals such as a personal computer (PC) and an image forming apparatus (MFP: Multi-Function Peripheral) to the NGN was known.

However, if an image is scanned and is transmitted, transmission information such as image data is edited and is transmitted in cooperation between the MFP having an image scanning function and PC.

However, since both the MFP and the PC are necessary in the method, installation costs increase. In addition, if a user is not accustomed to an operation of the PC, there is a problem in that the user feels that the operation is complex. On the other hand, even if the above-described functions are to be realized by the MFP singly, since the MFP does not only have to have a function of communicating with an external communication network but also to have a capacity of editing image data or the like, installation costs of the MFP also increase.

As methods for solving the problems, portable terminals such as smart phones which are being recently increasingly spread may be used. For example, image data read by the MFP may be transmitted to a portable terminal via a wireless LAN and may be preview-displayed on the portable terminal. However, there is no large-volume storage device in the portable terminal, and a capacity of editing image data or the like is not sufficient. In addition, a load on the network increases in transmission of image data using the wireless LAN, and thus a process time increases. Therefore, it is not easy to use a portable terminal as an alternative of a PC.

The exemplary embodiments have been made in consideration of these circumstances, and it is desirable to provide a communication control apparatus and a communication control system capable of transmitting a scanned image via an NGN by using a portable terminal without including a high-functional MFP or PC.

DETAILED DESCRIPTION

According to an embodiment, there is provided a communication control apparatus connected to an NGN (Next Generation Network), including an interface that is connected to an MFP (Multi-Function Peripheral) and a portable terminal via a network; a control unit that generates a scanning designation screen for inputting a scanning condition in response to an original document scanning request from the portable terminal, provides a request for starting scanning in the scanning condition input in the portable terminal to the MFP, acquires image data read by scanning an original document in the MFP, converts the acquired image data into a thumbnail image so as to generate a preview screen, and generates a transmission destination information screen for designating a transmission destination from transmission destination address information stored in a storage unit; a transmission and reception unit that transmits the scanning designation screen, and an information selection screen including the preview screen and the transmission destination information screen to the portable terminal; and a call control unit that transmits the image data to the designated transmission destination via the NGN on the basis of a transmission instruction from the portable terminal.

Figure 1:
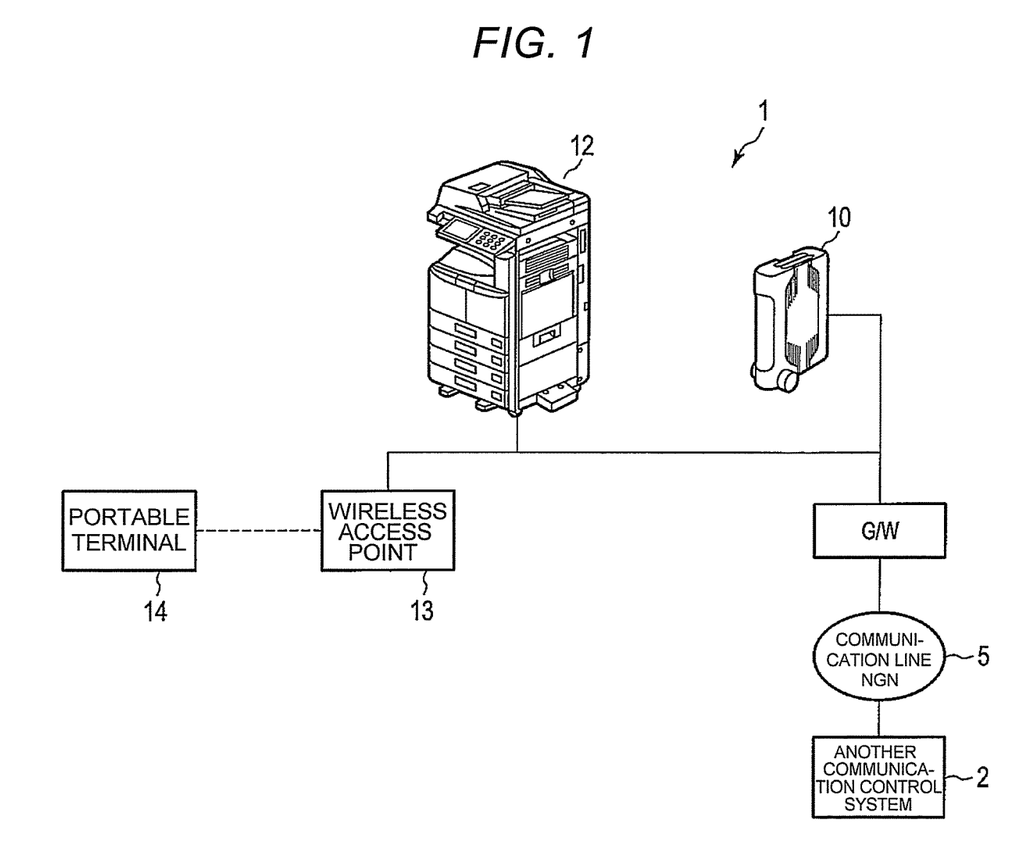
FIG. 1 is an exemplary diagram illustrating a configuration of a communication control system according to the present embodiment.

FIG. 1 is an exemplary diagram illustrating a configuration of a communication control system according to the present embodiment.

A communication control system 1 includes a communication control apparatus 10, a gateway (G/W) 11, a multi-function peripheral (MFP) 12, a wireless access point 13, and a portable terminal 14. The communication control apparatus 10, the gateway (G/W) 11, the multi-function peripheral 12, and the wireless access point 13 are signal-connected to each other via a LAN (Local Area Network).

The gateway 11 is connected to an external communication line 5, and is also connected to the communication control apparatus 10. The communication control apparatus 10 is an adaptor (interface) for transmitting and receiving data using the SIP to and from another communication control system 2 which is connected to the communication line 5, via the gateway 11. The MFP 12 not only scans, reads and copies an image of a designated resolution and paper size, but also has a function for comprehensively utilizing various functions of an office machine, such as an image reception function using FAX, an image reception function using an e-mail, and a printing image reception function using a network.

The communication line 5 forms an information communication network, called an NGN, capable of performing high-definition video communication and high-speed data communication in addition to audio communication, as described above. The NGN is configured based on an IP technique, and, the communication control systems may be connected to each other using the SIP (Session Initiation Protocol) or HTTP (Hyper Text Transfer Protocol) by the Internet.

The portable terminal 14 is connected to the LAN via the wireless access point 13, and sends and receives information to and from the communication control apparatus 10. In addition, the portable terminal 14 is a small-sized apparatus for carrying and dealing with information, and has a communication function, a display function, a data processing function, a storage function, and the like. However, a processing capacity thereof is lower than that of a so-called PC. The portable terminal 14 of the present embodiment includes, for example, a smart phone, a tablet terminal, or the like.

Figure 2:
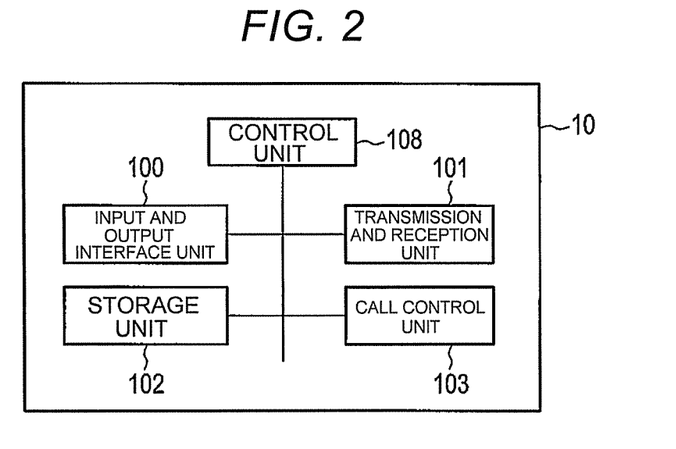
FIG. 2 is an exemplary diagram illustrating a configuration of a communication control apparatus according to the present embodiment.

FIG. 2 is an exemplary diagram illustrating a configuration of the communication control apparatus of the present embodiment.

The communication control apparatus 10 includes an input and output interface unit 100, a transmission and reception unit 101, a storage unit 102, a call control unit 103, and a control unit 108.

The input and output interface unit 100 is an interface for sending and receiving signals to and from another communication control system 2 via the communication line 5, and further for sending and receiving signals to and from the MFP 12, the wireless access point 13 and the portable terminal 14 which are connected via the LAN cable. The transmission and reception unit 101 controls transmission and reception operations of information. The storage unit 102 stores data files of images and the like, and address information of transmission destinations. Here, as a memory, an SD card, a HDD, or the like may be used. The call control unit 103 performs a connection operation with another communication control system 2 using the SIP. The control unit 108 collectively controls an operation of the communication control apparatus 10.

Figure 3:
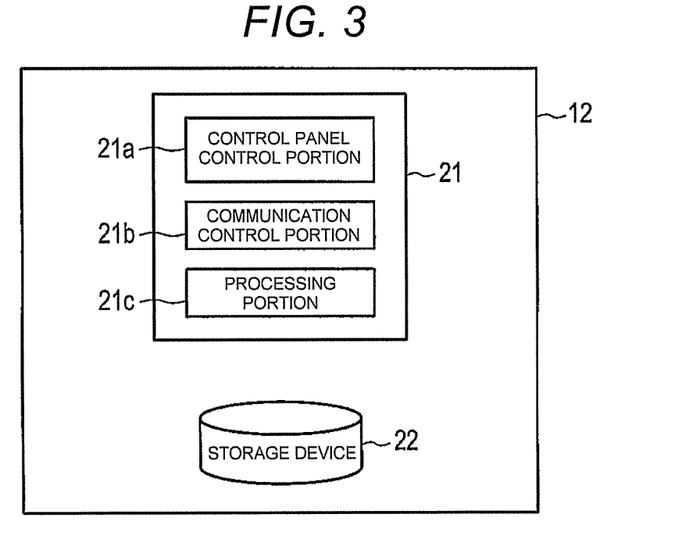
FIG. 3 is an exemplary diagram illustrating a configuration of a control system of an MFP in the communication control system of the present embodiment.

FIG. 3 is an exemplary diagram illustrating a configuration of a control system of the MFP 12 in the communication control system of the present embodiment.

The MFP 12 includes a control unit 21 and a storage device 22. The control unit 21 collectively controls an operation of the MFP 12. The storage device 22 is a storage medium installed inside the MFP 12. The storage device 22 preserves image data or the like of an original document read by a scanner (not shown).

In addition, the control unit 21 is provided with a control panel control portion 21a, a communication control portion 21b, and a processing portion 21c. The control panel control portion 21a controls operations of sending and receiving information to and from a control panel which is an input and output terminal provided in the MFP 12. The communication control portion 21b controls operations of sending and receiving information to and from the communication control apparatus 10, which are performed via the LAN. The processing portion 21c controls an operation of the MFP 12.

Figure 4:
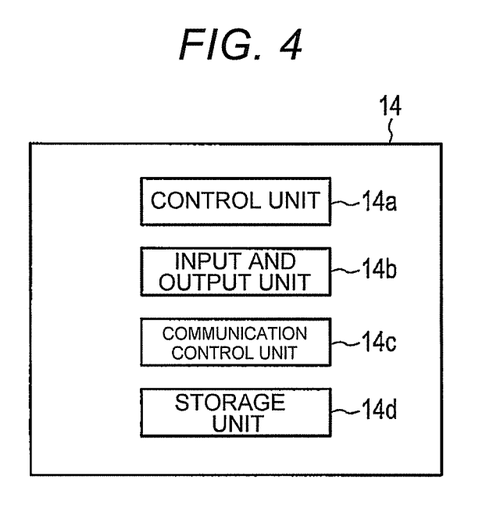
FIG. 4 is an exemplary diagram illustrating a configuration of a control system of a portable terminal in the communication control system of the present embodiment.

FIG. 4 is an exemplary diagram illustrating a configuration of a control system of the portable terminal 14 in the communication control system of the present embodiment.

The portable terminal 14 is provided with a control unit 14a, an input and output unit 14b, a communication control unit 14c, and a storage unit 14d. The control unit 14a collectively controls an operation of the portable terminal 14. The input and output unit 14b displays information in the portable terminal and acquires input information which is input through a user's operation. The communication control unit 14c controls operations of sending and receiving information to and from the communication control apparatus 10, which are performed via the LAN, using the wireless access point 13. The storage unit 14d stores information such as image data.

Figure 5:
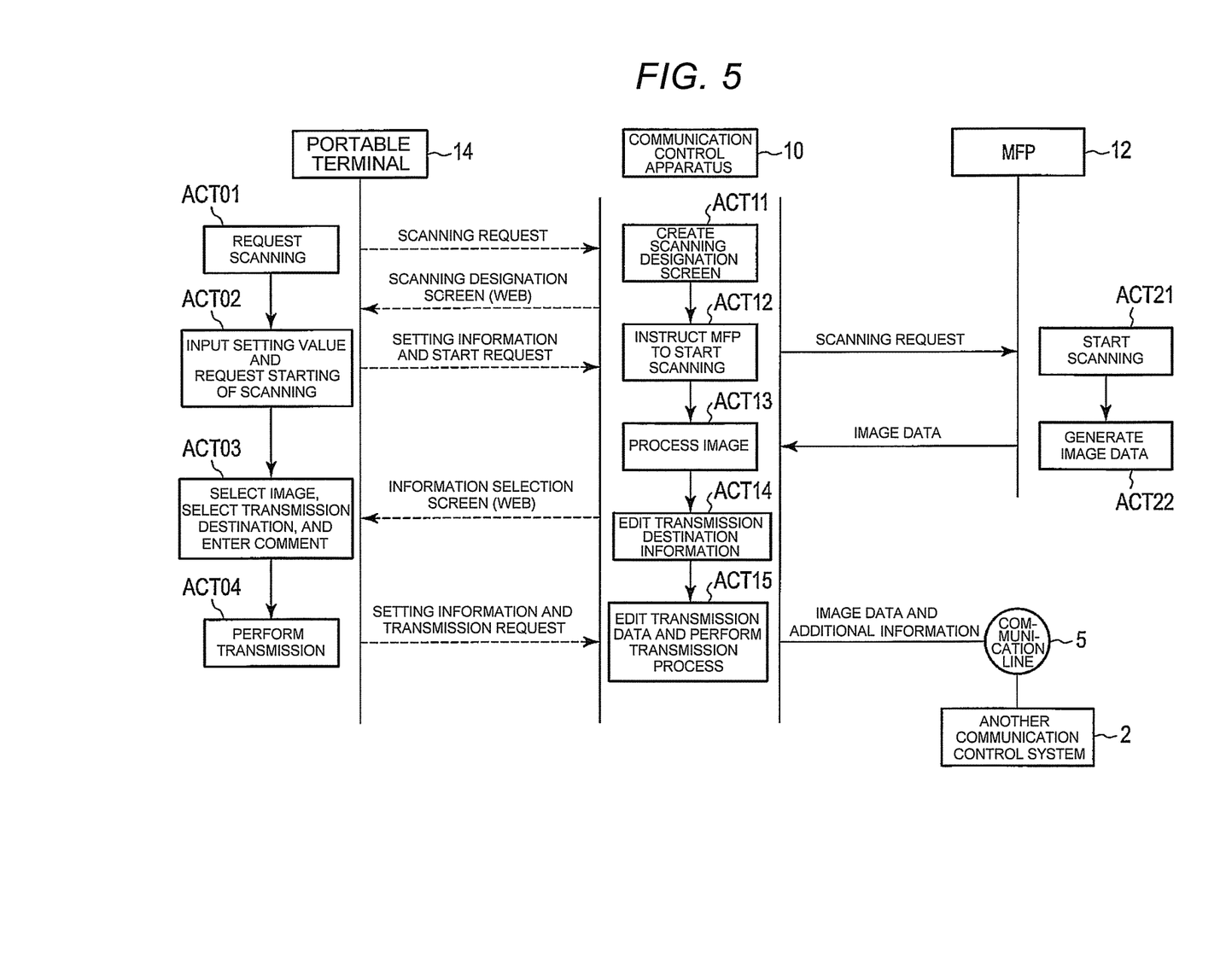
FIG. 5 is an exemplary flow diagram illustrating image transmission process procedures in the communication control system of the present embodiment.

FIG. 5 is an exemplary flow diagram illustrating image transmission process procedures in the communication control system of the present embodiment.

A user places an original document on an ADF (Automatic Document Feeder) of the MFP 12 and establishes a wireless communication connection between the portable terminal 14 and the wireless access point 13. In addition, in ACT 01, the user accesses the communication control apparatus 10 and sets a request for scanning the original document by operating the portable terminal 14. The scanning request is transmitted from the portable terminal 14 to the communication control apparatus 10.

If, in the communication control apparatus 10, the control unit 108 activates and recognizes the scanning request from the portable terminal 14, the control unit 108 generates a scanning designation screen for inputting scanning conditions in ACT 11. In addition, the scanning designation screen is transmitted to the portable terminal 14 as a Web browser screen.

Figure 6:
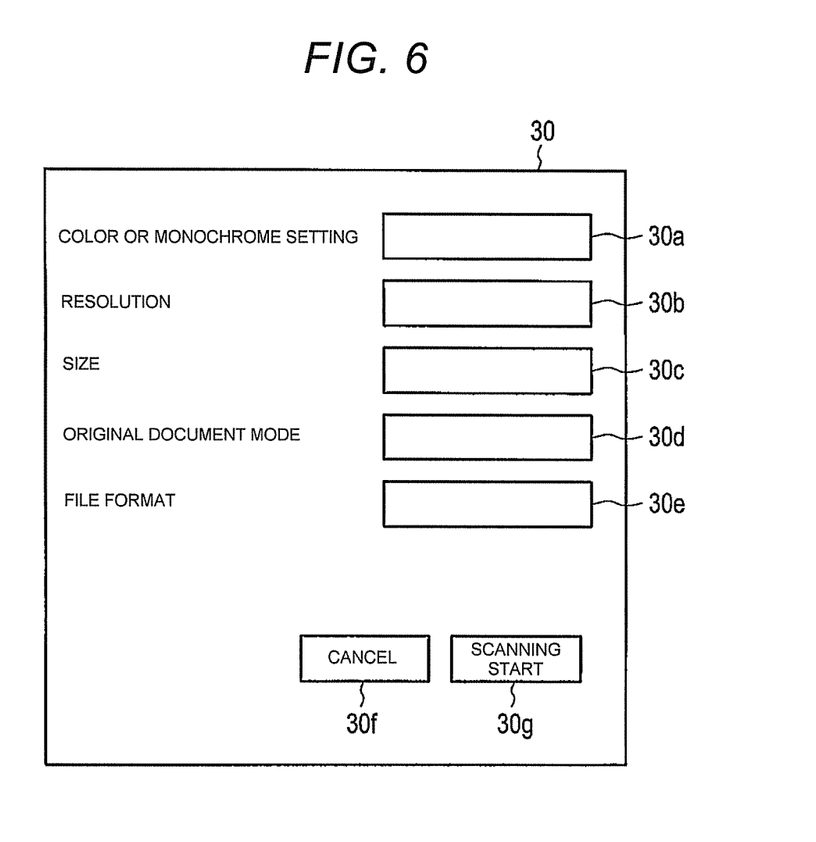
FIG. 6 is an exemplary diagram illustrating a scanning designation screen in the communication control system of the present embodiment.

FIG. 6 is an exemplary diagram illustrating the scanning designation screen 30 in the communication control system of the present embodiment.

The scanning designation screen 30 includes a color/monochrome designation input column 30a, a resolution input column 30b, a size input column 30c, an original document mode input column 30d, an image file format input column 30e, a cancel button 30f, and a scanning start button 30g.

Whether the original document is read as a color image or a monochrome image is input to the color/monochrome designation input column 30a. Information for designating a resolution of the read image data is input to the resolution input column 30b. A size of the original document (A4, B4, or the like) is input to the size input column 30c. An original document mode (a character, a picture, or the like) for obtaining an image suitable for the original document is input to the original document mode input column 30d. A type such as PDF or TIFF is input to the image file format input column 30e.

In ACT 02 of FIG. 5, the user inputs a setting value to the scanning designation screen 30. In addition; the user may change input data by pressing the cancel button 30f. If the user presses the scanning start button 30g, the communication control unit 14c transmits set information and a scanning start request to the communication control apparatus 10.

The control unit 108 of the communication control apparatus 10 transmits the scanning start request to the MFP 12 along with the set information (condition) in ACT 12.

The processing portion 21c of the MFP 12 performs scanning in the set condition in ACT 12.

In addition, in ACT 22, the processing portion 21c generates image data of the original document which is transmitted to the communication control apparatus 10. In addition, the MFP 12 returns the image data to the apparatus (transmission source) which transmits the scanning start request.

In the communication control apparatus 10, in ACT 13, the control unit 108 stores the transmitted image data into the storage unit 102 and performs an image process for generating a thumbnail image. In addition, the control unit 108 edits and generates a preview screen for displaying the thumbnail image. Further, in ACT 14, the control unit 108 generates a transmission destination information screen from the transmission destination address information stored in the storage unit 102. In addition, the control unit 108 generates an information selection screen (Web screen) including such screen and transmits the generated information selection screen to the portable terminal 14.

Figure 7:
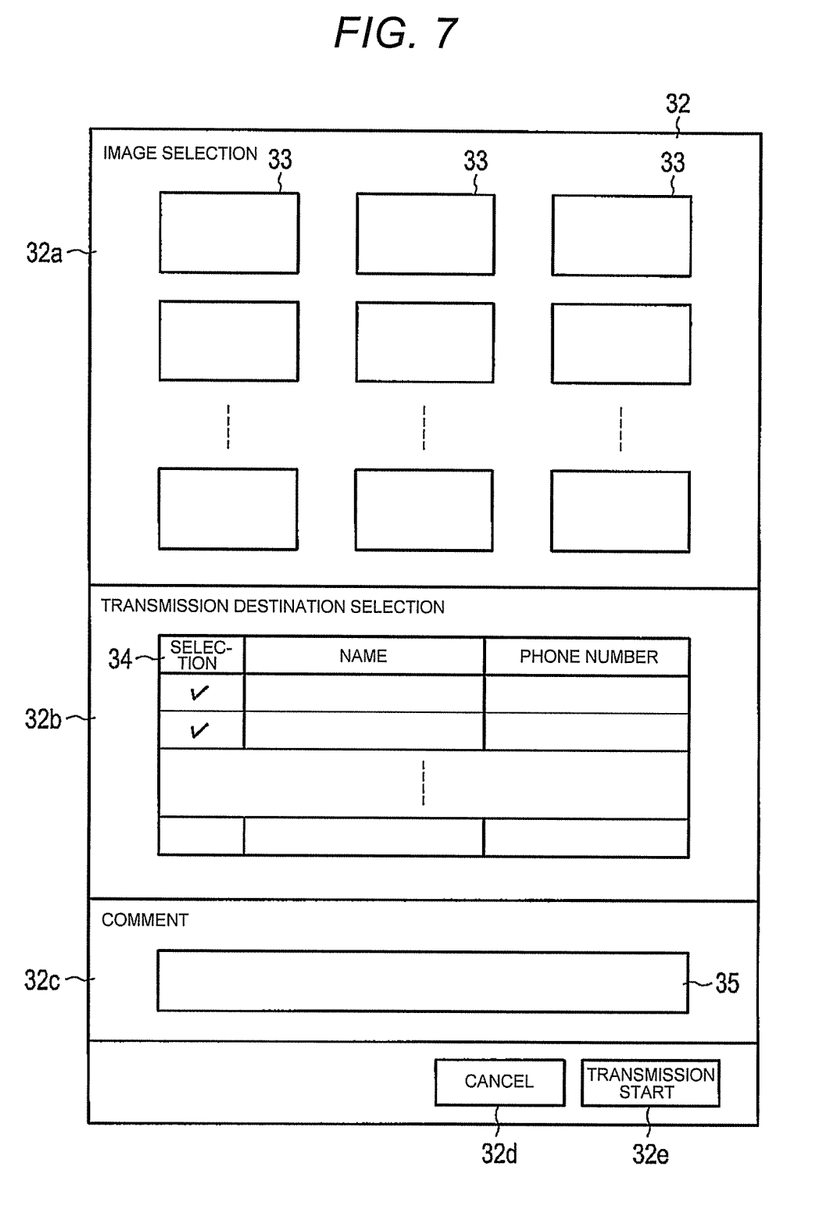
FIG. 7 is an exemplary diagram illustrating an information selection screen in the communication control system of the present embodiment.

FIG. 7 is an exemplary diagram illustrating the information selection screen 32 in the communication control system of the present embodiment.

The information selection screen 32 includes an image selection area 32a, a transmission destination selection area 32b, a comment writing area 32c, a cancel button 32d, and a transmission start button 32e.

The preview screen is displayed in the image selection area 32a. In other words, the thumbnail images of the scanned original document are displayed so as to be arranged in the image selection area 32a. The user can pinch out the thumbnail image such that the thumbnail image is enlarged and is checked, and thus can examine whether or not the image is good such as whether or not the image is skewed when scanning is performed. The user may flick the screen so as to display other thumbnail images. The user selects an image to be transmitted from the thumbnail images. If the user taps the thumbnail image, the thumbnail image is inversely displayed such that the selection thereof can be discriminated.

A transmission destination information screen is displayed in the transmission destination selection area 32b. In other words, a transmission destination selection column 34, a transmission destination name, a transmission destination address (phone number) are displayed in a list in the transmission destination selection area 32b. The user pinches out the transmission destination selection area 32b so as to be enlarged, thereby checking the transmission destination name and the transmission destination address. The user may flick the screen so as to display other transmission destination names and transmission destination addresses (phone numbers). If the user taps the transmission destination selection column 34, a mark is displayed in the transmission destination selection column 34 at that position so as to indicate the selection as a transmission destination.

A communication column 35 is provided in the comment writing area 32c. The user may input content sent to a transmission destination along with the image, to the communication column 35.

In ACT 03 of FIG. 5, the user selects an image to be transmitted, selects a transmission destination, and enters a comment. In addition, the user may change the input data by pressing the cancel button 32d. In ACT 04, if the user presses the transmission start button 30e, the communication control unit 14c transmits set information and a transmission request to the communication control apparatus 10.

In ACT 15, the communication control apparatus 10 extracts image data corresponding to the thumbnail image selected by the user from the storage unit 102 so as to be edited as transmission data. In addition, the comment is edited as additional information. Further, this information is transmitted to the designated transmission destination.

When the image data or the like is transmitted, the call control unit 103 transmits "INVITE" of an SIP method to a communication control apparatus of another communication control system 2 in order to establish a session, and the transmission and reception unit 101 performs transmission after the session is established. In addition, the reason why a phone number is used as a transmission destination in the above-described embodiment is that a transmission operation using the SIP is exemplified. In the NGN, connection between communication control systems is not limited to the use of the SIP (Session Initiation Protocol) and may be performed using HTTP (Hyper Text Transfer Protocol) by the Internet. Therefore, instead of a phone number in the embodiment, information using which the communication control apparatus of another communication control system 2 can specify itself may be employed. For example, as the information for specifying the communication control apparatus, a phone number may be employed between systems using the SIP, and a URL (Uniform Resource Locator) may be employed between systems using the HTTP.

In addition, although, in the above-described embodiment, transmission destination information is presented from the transmission destination file held by the communication control apparatus 10, the user may input a transmission destination by using contact address data such as phone numbers preserved in the portable terminal 14. Further, information held by the MFP 12 regarding a transmission destination may be transmitted to the communication control apparatus 10, and the communication control apparatus 10 may generate the above-described transmission information screen by using the information.

According to the above-described present embodiment, various effects can be achieved.

(1) It is possible to operate transmission by using a portable terminal which is not provided with a large volume of an image storage device and has a low image processing capacity. Therefore, it is possible to transmit image data read by the MFP without providing a PC.

(2) According to the procedures of the present embodiment, it is possible to suppress a load on a LAN since the number of transmissions of a large volume of image data over the LAN is small. Typically, a portable terminal is connected to a wireless LAN or the like, and has a small bandwidth. For this reason, transmission of a large volume of data applies an excessive load on the wireless LAN since circumstances are different from in a case of being connected to a wired LAN. This influence is exerted on all users of an access point.

(3) It is possible to freely preview transmission image data by using high operability of a portable terminal.

(4) Since a transmission destination can be directly designated from contact address information (address book) of the communication control apparatus, an efficient operation is possible.

(5) Since a preview image is created by the communication control apparatus, preview is possible even in a portable terminal which does not have a mass image storage device and has a low image processing capacity.

(6) Since a Web screen is transmitted from the communication control apparatus, and an operation is performed on the Web screen in a portable terminal, the present embodiment is applicable to a portable terminal having a low processing capacity. If an image process is performed in a portable terminal, there are cases where a long time is necessary, or the process stops on the way, for example, due to insufficient memory.

In addition, the respective functions described in the above-described embodiment may be configured using hardware, or may be realized by causing a computer to read a program which describes the respective functions therein using software. Further, the respective functions may be configured by appropriately selecting either software or hardware.

Furthermore, the respective functions may be realized by causing a computer to read a program stored on a recording medium (not shown). Here, the recording medium in the present embodiment may employ any recording format as long as the recording medium can record a program thereon and can be read by a computer.

In addition, the present invention is not limited to the above-described embodiment and may be implemented by modifying the constituent elements in the scope without departing from the spirit in an implementation phase.

Various inventions may be made by appropriately combining a plurality of constituent elements disclosed in the above-described embodiment. For example, several constituent elements may be omitted from the overall constituent elements shown in the embodiment. Further, constituent elements covering different embodiments may be appropriately combined.

What is claimed is:

1. A communication control apparatus connected to an NGN (Next Generation Network), comprising:
    an interface that is connected to an MFP (Multi-Function Peripheral) and a portable terminal via a network;
    a control unit that generates a scanning designation screen for inputting a scanning condition in response to an original document scanning request from the portable terminal, provides a request for starting scanning in the scanning condition input in the portable terminal to the MFP, acquires image data read by scanning an original document in the MFP, converts the acquired image data into a thumbnail image so as to generate a preview screen that comprises a plurality of thumbnail images including the thumbnail image, generates a transmission destination information screen for designating a transmission destination from transmission destination address information stored in a storage unit, and creates an information selection screen having the preview screen and the transmission destination information screen rendered in a single screen;
    a transmission and reception unit that transmits an information selection screen to the portable terminal; and
    a call control unit that transmits the image data corresponding to a selected thumbnail image selected from the preview screen of the information selection screen to the designated transmission destination selected from the transmission designation information screen of the information selection screen via the NGN on the basis of a transmission instruction from the portable terminal.

2. The apparatus according to claim 1, wherein the interface is connected to the portable terminal via a wireless LAN.

3. The apparatus according to claim 2, wherein the portable terminal is a smart phone or a tablet terminal.

4. The apparatus according to claim 1, wherein the call control unit communicates with other communication control apparatuses connected to the NGN, by using an SIP (Session Initiation Protocol).

5. The apparatus according to claim 1, wherein the transmission destination address information stored in the storage unit is information transmitted from the portable terminal.

6. The apparatus according to claim 1, wherein the transmission destination address information stored in the storage unit is information transmitted from the MFP.

7. A communication control system comprising:
    a communication control apparatus that is connected to an NGN (Next Generation Network) and is connected to an MFP (Multi-Function Peripheral) and a portable terminal via a network,
    wherein the communication control apparatus includes
        an interface that is connected to the MFP and the portable terminal via the network;
        a control unit that generates a scanning designation screen for inputting a scanning condition in response to an original document scanning request from the portable terminal, provides a request for starting scanning in the scanning condition input in the portable terminal to the MFP, acquires image data read by scanning an original document in the MFP, converts the acquired image data into a thumbnail image so as to generate a preview screen that comprises a plurality of thumbnail images including the thumbnail image, generates a transmission destination information screen for designating a transmission destination from transmission destination address information stored in a storage unit, and creates an information selection screen having the preview screen and the transmission destination information screen rendered in a single screen;
        a transmission and reception unit that transmits an information selection screen to the portable terminal; and
        a call control unit that transmits the image data corresponding to a selected thumbnail image selected from the preview screen of the information selection screen to the designated transmission destination selected from the transmission designation information screen of the information selection screen via the NGN on the basis of a transmission instruction from the portable terminal,
    wherein the portable terminal includes
        a communication control unit that accesses the communication control apparatus and transmits an original document scanning request thereto; and
        an input and output unit that displays the scanning designation screen transmitted from the communication control apparatus and inputs a scanning condition via the scanning designation screen,
        wherein the communication control unit transmits information regarding a transmission destination the information selection screen which is displayed by the input and output unit and is transmitted from the communication control apparatus, and the transmission instruction of the image data, to the communication control apparatus, and
    wherein the MFP includes
        a scanner that reads the original document according to the scanning condition transmitted from the communication control apparatus; and
        a communication control unit that transmits image data of the original document read by the scanner to the communication control apparatus.

8. The system according to claim 7, wherein the communication control apparatus is connected to the portable terminal via a wireless LAN.

9. The system according to claim 8, wherein the communication control apparatus communicates with other communication control apparatuses connected to the NGN, by using an SIP (Session Initiation Protocol).

10. The system according to claim 8, wherein the portable terminal is a smart phone or a tablet terminal.

\* \* \* \* \*